Nov. 21, 1967   H. BAUER   3,353,736
FASTENER CARTRIDGE AND ASSEMBLY
Filed July 30, 1965
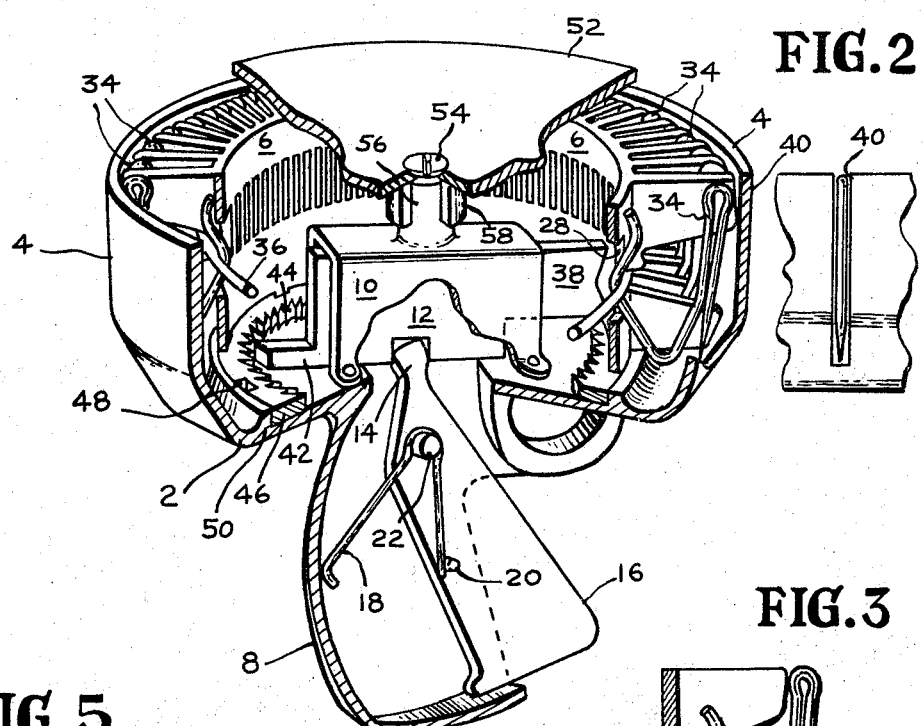
FIG.1
FIG.2
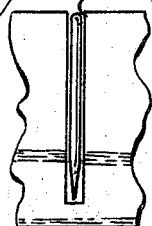
FIG.3
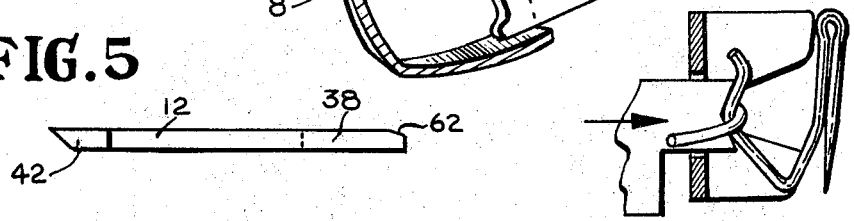
FIG.5
FIG.4
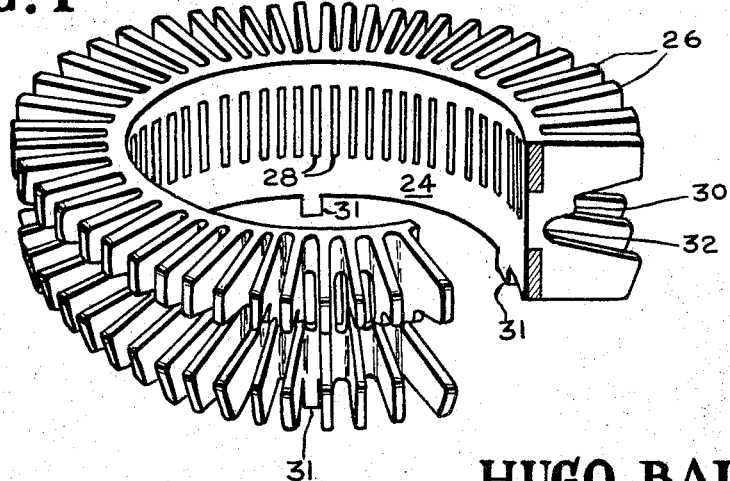
HUGO BAUER
INVENTOR United States Patent Office 3,353,736
Patented Nov. 21, 1967

3,353,736
FASTENER CARTRIDGE AND ASSEMBLY
Hugo Bauer, 124 Summit Court, Westfield, N.J. 07090
Filed July 30, 1965, Ser. No. 475,923
4 Claims. (Cl. 227—107)

ABSTRACT OF THE DISCLOSURE

Drapery hooks are resiliently held in a cylindrical cartridge between radial fins thereon; the cartridge, when mounted on an assembly, is rotated by squeezing a trigger on a hand tool, so as to index successive drapery hooks for discharge by a discharge assistant.

Background of the invention

This invention relates to fasteners and more particularly to a fastener manipulation cartridge and assembly.

Description of the prior act

In the fastening art, many automatic application machines and hand-dispensing tools have been provided. One type of dispensing tool relates to hand-operated devices for holding fasteners and providing operator-controlled movement thereof so as to facilitate the application of the fastener to an article.

Summary of invention

An object of the invention is to provide an improved fastener application device.

Certain devices in the art, such as ordinary staples of the type used for fastening paper and the like, use a linear feed, both with and without stripping of the fasteners by the discharge assistant. Such devices rely upon a resilient force to maintain a fastener in operative relation with the discharge assistant as each successive fastener is used. Resilient stress upon a long string of fasteners results in jamming and other erratic feed problems unless precision arrangements of sturdy component parts are utilized. Provision of fastener-applying tools of high quality has been achieved only at a relatively high cost. Furthermore, most fasteners must be hand-fed into the apparatus used for the application thereof; this is so due to the fact that automatic feeding means of a sufficiently high quality are generally too costly for use in hand-operated devices.

Certain hand operated devices have several parts which must be assembled together before they may be operated. Whenever the feeding relationships rely on the positioning of the several parts, assembly thereof must be precise and capable of easily being achieved. The loading of fasteners must be quick and simple, and such loading should not involve the assembly of parts which interrelate in feeding.

Whenever hand operated devices are involved, the operator should have freedom of usage without rough edges or delicate parts becoming entangled with objects in the vacinity. Also, some fastener tools known in the art are subject to a propensity for having the fasteners therein interfering with one another or becoming tangled.

Wherefore, another object of the invention is to provide a fastening application assembly capable of easy manufacture from inexpensive materials.

Other objects of the invention include:

Eliminating the need for hand-feeding of fasteners into a fastener-applying device;

Provision of a low-cost, self-feeding fastener-applying device capable of sustained, reliable operation;

Provision of a fastener applying device capable of assured, simple alignment of parts;

Elimination of interference between fasteners in an application tool;

Provision of a smooth, easily used fastener tool capable of sustained, reliable operation;

Provision of an improved cartridge-loaded tool.

A more specific object of the invention is to provide a hand-operated fastener tool of the class described hereinbefore, which is adapted to assist in the application of drapery hooks to fabric.

In accordance with the present invention, there is provided a cartridge which may be manufactured of inexpensive material such that the cartridge can be thrown away in its entirety when the supply of fasteners therein (such as drapery hooks) is exhausted. The cartridge is generally cylindrical in nature, and utilizes a rotary motion to feed successive fasteners to the discharge position. In a preferred embodiment of the invention, the fasteners are held in place by a simple resilient member, such as an ordinary elastic band. Each fastener is held in a separate compartment, independently of the other fasteners. The cartridge is advanced in successive applications by means of a simple movement of a trigger-like device, which also serves to partially eject a fastener from the cartridge, placing the fastener in a position with respect to the assembly which facilitates utilization of the fastener, such as applying the fastener to an article. In the illustrative embodiment, a sliding member is caused to move in a forward direction by the squeezing of a trigger, and this movement pushes a drapery hook radially outward from the cartridge and through a discharge orifice in the cartridge-holding assembly so that the hooks may be inserted into fabric by a downward motion of the entire assembly; once the hook is inserted in the fabric, a reverse motion of the assembly causes the hook to release itself from the elastic band which holds the hooks to the cartridge. Releasing of the trigger will cause the sliding member to operatively engage an indexing ring so as to advance the cartridge in such a manner as to present the next succeeding hook to the operating position.

This invention permits the use of a throw-away cartridge, within which fasteners such as drapery hooks may be supplied. Because the feeding of each of the fasteners is independent of each other fastener, and because each fastener is itself precisely located by the cartridge with respect to the discharging means, a great deal of precision in the assembly is not required. A rotary motion of the cartridge, coupled with a radial motion of the fastener in the discharge thereof, promotes smooth operation without the need for high-quality manufacture. This means that the entire assembly can be inexpensively manufactured and therefore made readily available as a hand-operated assistant in the application of fasteners.

Other objects, features and advantages of the present invention will become more apparent in the light of the following description of an illustrative embodiment thereof, as shown in the drawing.

Brief description of the drawing

FIG. 1 is a partially broken away perspective of an illustrative embodiment of a fastener cartridge and assembly in accordance with the present invention;

FIG. 2 is a partial elevation of the embodiment shown in FIG. 1;

FIG. 3 is a partial elevation of the embodiment shown in FIG. 1 illustrating the position of a drapery hook after the movement of the sliding member so as to put the hook in position for insertion into the fabric;

FIG. 4 is a perspective drawing of a cartridge as shown in the embodiment of FIG. 1;

FIG. 5 is a plan view of a sliding element for advancing the cartridge and pushing fasteners.

Description of the preferred embodiment

Referring now to FIG. 1, a main assembly frame 2 comprises a dish-shaped portion 4, within which a cartridge 6 may be inserted, as well as a handle portion 8. Mounted within the base of the dish portion 4 is a sliding element retaining piece 10, within which a sliding element or member 12 is free to move backward and forward under the urging of a pusher 14 which is part of a trigger member 16. Although distorted to more clearly show the various parts in FIG. 1, the sliding member 12 would be of a size so as to fit snugly, yet slide easily, within the retaining piece 10. The trigger member 16 is resiliently urged into position shown in FIG. 1, by means of a spring 18 which is compressed between a pin 20 and the inner backward portion of the handle portion 8. The spring 18 is kept in place by a pin 22 (extending from the handle portion 8) which also provides the pivot about which the trigger member 16 rotates. The spring can be of any suitable material such as beryllium copper.

Referring briefly to FIG. 4, the cartridge is generally cylindrical in shape, somewhat like a carousel. It includes a main cylinder portion 24 having fin portions 26 extending radially therefrom. Between each of the fins 26 there is a slot 28 which extends for about one-half of the height of the main cylinder portion 24 in the central part thereof. Each of the fins 26 has a cut-away portion which enables an elastic band to be placed in a first position during the loading of the cartridge as a final step in the packaging of the hooks, and then permits having the elastic band put in operative relation to hold the hooks in their final position within the cartridge. Each cutaway portion includes a shallow notch 30 and a deeper notch 32, the shallow notches 30 being the portions which hold the elastic band as the hooks are loaded, whereas the deeper notches 32 are sufficiently deep in terms of the outward extremity of the cartridge to permit holding the drapery hooks securely in place within the spaces between each of the fins 26.

Returning to FIG. 1, a plurality of drapery hooks 34 are shown in position within the cartridge, being restrained therein by an elastic band 36. Each hook 34 is partially within a related slot 28 so that a discharge assistant portion 38 of the sliding member 12 may engage the hook and push it radially outward through a slot 40 which is within the forward wall of the main assembly portion 2 (see FIG. 2). A bevelled tooth 42 of the sliding element 12 operatively engages successive teeth 44 on an indexing ring 46, the ring having notches 48 therein which are engaged by the driving keys 31 at the base of the cartridge 6. The indexing ring 46 is held in place by a ring-shaped retaining lip 50 of the main assembly frame 2. Thus, the indexing ring 46 is free to rotate within the retaining lip 50, and the cartridge 6 is drivingly engaged with the indexing ring 46 by means of the driving keys 31 on the cartridge 6 being inserted into the notches 48 within the indexing ring 46.

Whenever the trigger member 16 is released so that it can be urged into the position shown in FIG. 1, it will engage the next successive tooth 44 so as to force the indexing ring 46 to move in a counter-clockwise direction with respect to the main assembly frame 2, thus causing the cartridge 6 to advance with it and thereby feed the next drapery hook into the operating position at the front (to the right, as shown in FIG. 1) of the assembly.

The sliding member 10, as shown in FIG. 5, has a slight bevel 62 on the hook-pushing end 38 thereof. Each of the slots 28 in the cartridge 6 may also be slightly beveled so as to provide a slight, additional advancement of the cartridge 6 as the sliding member 12 moves forward. This action permits the beveled tooth 42 to engage the next successive tooth 44 on the indexing ring as the trigger is released following the use of successive hooks.

Although not essential to the invention, a top portion 52 is held in place by a screw 54 which threads into an extension 56 on the sliding member retaining piece 10, the top 52 being centered therein by means of a hub 58. Any other suitable means might be utilized to keep the cartridge 6 and the indexing ring 46 from raising upwardly while the tool is being used. The top 52 also serves to prevent the hook 34 from slipping as it is being fed into the fabric. Provision of a downwardly extending lip at the periphery of the top would permit hooks of smaller size to be used at times.

In operation, the assembly would be held in the hand of an operator and the trigger member 16 would be moved in a clockwise fashion about the pivot pin 22 by squeezing it with relation to the handle portion 8. This will cause the pusher 14 to advance to the front of the assembly (to the right, as shown in FIG. 1), causing the slideable member 12 to move to the right as well. The discharge assistant portion 38 on the sliding member 12 would engage the edge of a slot so that a bevel 62 thereon (see FIG. 5) will cause the cartridge to advance a slight amount so as to align a hook with the slot 40. The sliding member 12 will then pass through the slot 28 and engage a hook 34 so that it will pass radially outward through a slot 40 and appear as shown in FIG. 3. Although tension on adjacent hooks is removed by stretching of the elastic, these hooks are confined and will remain nearly in place. With the hook so extended from the assembly, the operator pulls downwardly (as shown in FIG. 1) against a piece of fabric so as to cause the hook to engage the fabric. Once the hook has engaged the fabric, the operator moves the entire assembly upwardly (as shown in FIG. 1) so that the drapery hook slips out from the elastic band 36, thus completely releasing the hook from the cartridge 6. The elastic tension is low, so this will readily occur. The elastic then resumes its rest position, and all hooks are again under tension. Once the hook is completely released, the operator may release the trigger 16, thereby allowing the spring 18 to urge the trigger 16 in a counterclockwise direction, thus causing the pusher 14 to force the sliding element 12 to the rear of the assembly (to the left as shown in FIG. 1) so that the beveled tooth 42 of the element 12 will engage the next succeeding one of the teeth 44 in the indexing ring 46. This causes the indexing ring 46 to advance in a counter-clockwise direction and, due to the relationship between the driving keys 31 and the notches 48, the movement of the indexing ring 46 causes the advancement of the cartridge 6 one position in a counter-clockwise direction so as to present the next succeeding hook to the operating position at the front of the assembly (extreme right of FIG. 1).

The various parts could be made of any suitable material, preferably formed by moulding or casting.

The invention is well suited to the fastener art because of the functional elements thereof, as described hereinbefore. For instance, note that a single, simple resilient restraining means is all that is required to keep the hooks in place on the cartridge; this may take the form of a simple, common elastic band. Another feature is that all of the feeding motion is rotary, and is guided only by the large diameter retaining lip 50, and all moving parts are fully enclosed within the assembly. Proper alignment of the cartridge 6 with the indexing ring 46 is assured since the top 52 cannot be secured in place unless the drive keys 31 are properly set within the notches 48. Thus a smooth reliable tool is provided.

The foregoing is a description of an illustrative embodiment of a fastener insertion assembly, together with a fastener cartridge readily adapted for use therewith. It should be obvious that, although a drapery hook is the fastener used for illustrative purposes, the apparatus illustrated herein may be readily adapted for use with similar fasteners. Additionally, variations in the details of the various working parts might be made to facilitate various processes of manufacture or different styles of appearance, as well as to promote slight modifications in the operation thereof. Therefore, while the invention has been shown and described with respect to a preferred embodiment thereof, it should be understood by those skilled in the art that the foregoing and other changes and omissions in the form and detail thereof may be made therein without departing from the spirit and scope of the invention.

Having thus described typical embodiments of the invention, that which is claimed as new and to be secured by Letters Patent of the United States is:

1. A fastener cartridge adapted for use with a dispensing tool having a discharge assistant, comprising:

a main cylindrical portion having integrally-formed fin portions spaced about the periphery thereof and extending radially therefrom, said main cylindrical portion being provided with a plurality of longitudinal slots, one corresponding to each of said fin portions, each slot being formed in said main cylindrical portion between a pair of adjacent ones of said fin portions, said fin portions forming a plurality of spaces, each space being disposed between a pair of adjacent fin portions, each space adapted to receive a fastener, each of said slots being adapted to permit passage of a discharge assistant from a position within said main cylindrical portion radially outward into one of said spaces so as to discharge a related one of said fasteners therefrom.

2. A fastener cartridge assembly comprising, in combination, a fastener cartridge according to claim 1 and a stretched elastic band disposed in tension about the periphery of said cartridge and retained in position by the surface depressions in said fins, said elastic band adapted to resiliently urge fasteners disposed within said spaces radially inwardly toward said main cylindrical portion.

3. A fastener dispensing assembly including a fastener cartridge having a main cylindrical portion with radially extending spaced fin portions forming spaces between adjacent fins and a plurality of longitudinal slots in said main cylindrical portion between adjacent pairs of said fin portions and opening into said spaces, said spaces each being adapted to receive a fastener; and a main frame portion adapted to receive said cartridge, said main frame portion having slidably disposed thereon a discharge assistant, means for resiliently urging said discharge assistant into a rest position which is diametrically within said main cylindrical portion of said cartridge when said cartridge is disposed on said main frame, said main frame having disposed thereon operator controlled means for sliding said discharge assistant, said discharge assistant, when sliding in response to said operator controlled means, passing outwardly through one of the slots in said cartridge and moving the fastener which is disposed in the space related to the slot through which it slides radially outward in said space.

4. The fastener dispensing assembly according to claim 3 wherein said main frame has rotatably disposed thereon an indexing ring, said indexing ring adapted to receive said cartridge, said cartridge interlocking with said indexing ring for rotation with said indexing ring as said indexing ring rotates, said indexing ring including teeth extending radially inwardly, said discharge assistant including a fully chamfered end which, when said discharge assistant is in said rest position, will be seated against one of the teeth of said indexing ring, said discharge assistant including a partially chamfered end longitudinally opposite said fully chamfered end, said partially chamfered end contacting an edge of one of said slots through which it passes as it is slid outwardly in response to said operator controlled means, thereby causing said cartridge, and therefore said index ring to which it is attached, to rotate slightly with respect to the rest position thereof caused by the interengagement with said fully chamfered end and one of said teeth, whereby said discharge assistant, under control of said operator controlled means, and in cooperation with said indexing ring, indexes said cartridge to successive rotary positions in response to the sliding thereof.

References Cited

UNITED STATES PATENTS

| | | | |
|---|---|---|---|
| 65,360 | 6/1867 | Falardo | 227—137 |
| 2,371,917 | 3/1945 | Rosenberg | 211—131 |
| 2,888,680 | 6/1959 | Krivis | 227—110 |
| 2,954,560 | 10/1960 | Kerman | 227—110 |
| 3,056,506 | 10/1962 | Fuller et al. | 221—163 X |

GRANVILLE Y. CUSTER, JR., *Primary Examiner.*